United States Patent [19]

Hansen

[11] 3,904,582

[45] Sept. 9, 1975

[54] ANTIOXIDANTS FOR POLYOLEFINS

[75] Inventor: Ralph Holm Hansen, Short Hills, N.J.

[73] Assignee: Bell Telephone Laboratories, Incorporated, Murray Hill, N.J.

[22] Filed: July 30, 1974

[21] Appl. No.: 493,100

[52] U.S. Cl. ... 260/45.8 N; 260/45.9 NC; 260/45.9 PY; 260/5.59 S
[51] Int. Cl.² .......................................... C08K 5/16
[58] Field of Search.. 260/45.9 PY, 45.9 NC, 559 S, 260/45.8 N; 106/186

[56] References Cited
UNITED STATES PATENTS

| | | | |
|---|---|---|---|
| 3,117,104 | 1/1964 | Bown | 260/45.9 |
| 3,542,573 | 11/1970 | Biland | 260/45.9 |
| 3,808,273 | 4/1924 | Burdet | 260/45.9 |

Primary Examiner—Donald E. Czaja
Assistant Examiner—William E. Parker
Attorney, Agent, or Firm—E. M. Fink

[57] ABSTRACT

A class of antioxidants for polyolefins is described having the general formula:

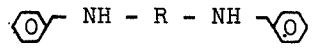

wherein R is an aromatic oxamide, imide or imine radical. These antioxidants when incorporated in stabilizing amounts in polyolefins have proven to be as effective, and in some cases superior, to conventional (hindered phenolic) antioxidants from the standpoint of protection against thermal oxidative degradation.

7 Claims, 2 Drawing Figures

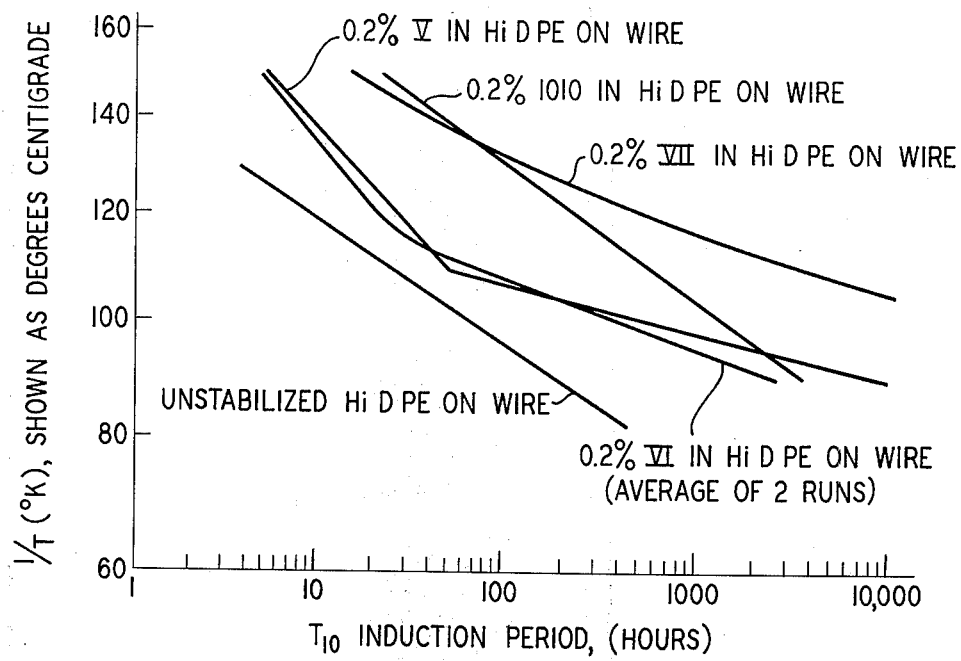
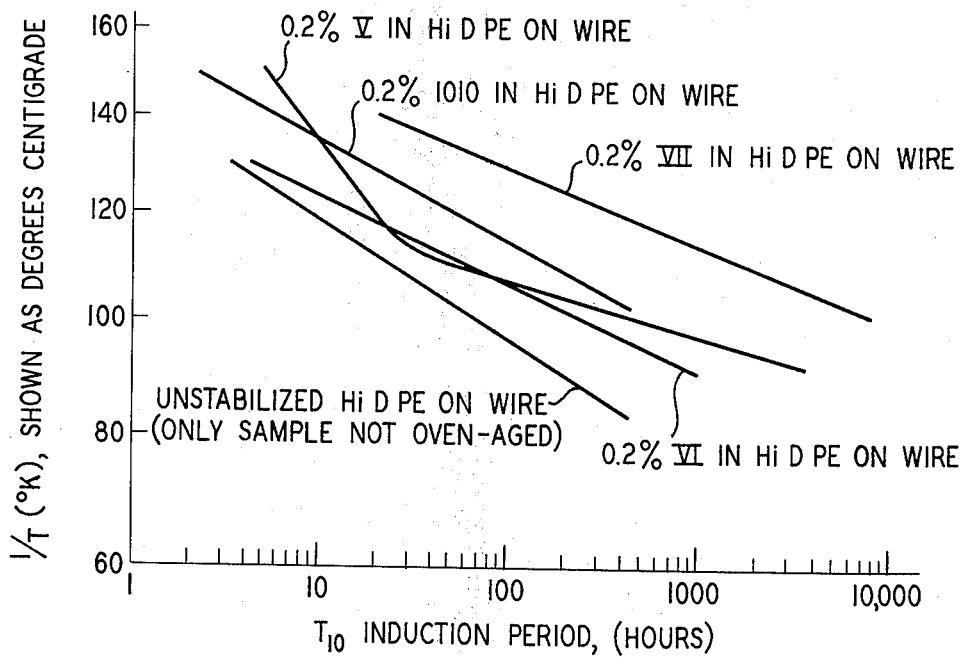

ANTIOXIDANTS FOR POLYOLEFINS

BACKGROUND OF THE INVENTION

1. Field of the Invention

This invention relates to a class of antioxidants. More particularly, the present invention relates to a class of antioxidants in the aryl amine family which has proven suitable for stabilizing polyolefins.

2. Description of the Prior Art

Heretofore, in the field of electronics, considerable attention has been directed to the effects and prevention of thermal oxidative degradation in polyolefins, specifically polyethylene and polypropylene. In recent years, workers in the art have developed a wide variety of antioxidants and have constantly been trying to determine the most effective stabilizer in conjunction with the amount to be used at the anticipated service temperature.

Polyethylene is conventionally stabilized by the incorporation of approximately 0.1 percent by weight based upon the weight of the polymer of a chain-terminating antioxidant since the degradation of polymers proceeds by a cyclic chain reaction.

Antioxidant materials that have provided a marked retardation of thermal oxidation characteristically require a radical such as a secondary aromatic amino group or a hindered hydroxyl group attached to an aromatic ring. These radicals are effective as antioxidants because of a resulting resonant stabilized structure.

The effectiveness of antioxidant materials in present use has been hindered by the inability of the antioxidant to be retained by the polymer and not lost by volatilization, extraction, or blooming. Those which will be retained best over a wide range of concentrations will have very low volatility and should be insoluble or very soluble. However, two common stabilizers, namely 4,4'-thiobis-(3-methyl-6-t-butyl-phenol) and tetrakis-[methylene 3-(3',5'-di-t-butyl-4'-hydroxyphenyl) propionate] methane, have finite solubilities in polyethylene which is much less than 0.1 percent concentration at which they are normally used. They bloom to the surface and their effectiveness is greatly reduced. Other difficulties in the past have included the inability to produce a favorable nonlinear behavior in a graphical representation of failure time in hours against the reciprocal of the absolute temperature in degrees Centigrade. Favorable nonlinear behavior is defined as a condition when the degree of efficacy of the antioxidant when used in cable sheathing is greater than what is predicted from extrapolating the results of high temperature experiments.

SUMMARY OF THE INVENTION

In accordance with the present invention, it has been found that a family of aryl amines manifests a significant antioxidant effect when added to polymers of interest. The materials considered for use herein are of the following general formula:

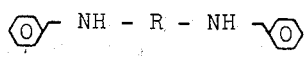

wherein —R— may be selected from the group consisting of:

A. 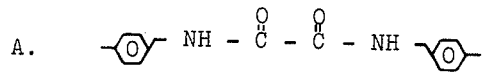

B. 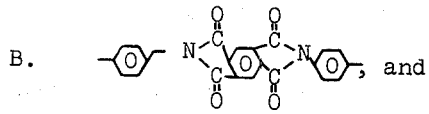 and

C. 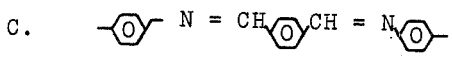

The antioxidants described herein are typically effective at all temperatures ranging from ambient temperatures to about 70°C, the anticipated service temperature. The antioxidants mentioned above have evidenced activation energies which increase from lower values above the melting region of the polymer to much higher values when the polymer is in its solid semicrystalline state even in the presence of copper. This phenomenon is highly desirable and one that has not previously been observed in antioxidants. Studies have revealed that the use of the described antioxidants in combination with conventional copper inhibitors tends to result in a synergistic affect.

BRIEF DESCRIPTION OF THE DRAWING

The advantages gained by the use of the compositions described herein will be more fully appreciated by reference to the following description taken in conjunction with the accompanying drawing wherein:

FIG. 1 is a graphical representation in coordinate form of an induction period in hours against the reciprocal of temperature in degrees centigrade showing the oxidative degradation of unaged polyethylene copper wire sheathings containing either a conventional antioxidant or one of the three preferred compositions described herein;

FIG. 2 is a graphical representation in coordinate form of induction period in hours against the reciprocal of temperature in degrees centigrade showing the oxidative degradation of aged polyethylene copper wire sheathings containing either a conventional antioxidant or one of the three preferred compositions described herein;

DETAILED DESCRIPTION

The described oxamide is of the following formula:

and is a member of a class of insoluble antioxidants derived from N-phenyl-p-phenylenediamine. This oxamide is an example of an autosynergistic stabilizer since it combines both antioxidant and copper inhibitor functions in the same molecule.

The imide is of the following formula:

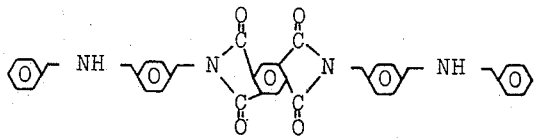

and is derived from N-phenyl-p-phenylenediamine and pyromellitic dianhydride.

The imine is of the following formula:

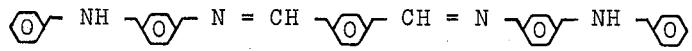

and is prepared from N-phenyl-p-phenylenediamine and terephthaldehyde.

The above mentioned antioxidants may be prepared by synthetic techniques well-known to workers in the art.

The three categories of aryl amines mentioned herein, the oxamide, imine and imide may be incorporated in polyolefins by the techniques noted below.

It should be understood that the description below is only for the purposes of exposition and is not to be construed as limiting.

The antioxidant compositions are typically produced on a heated differential-speed mill followed by the preparation of films through compression molding slighly above the melting range of the polymer. Wire samples are prepared from melted material, using a twin screw extruder keeping the barrel and crosshead temperatures at approximately 218°C. Antioxidant effectiveness is determined by measuring the duration of time before interaction of 10 cubic centimeters of oxygen per gram of polymer. Isothermal oxygen uptake studies are executed in pure oxygen at atmospheric pressure over a range of elevated temperatures, namely, 83° to 150°C.

The considered range of concentration of antioxidants employed herein is 0.2 to 5.0 percent by weight, based upon the weight of the polymer. Although the aforementioned range is not absolute, it should be understood that the minimum is dictated by considerations relating to the amount found necessary to effect significant antioxidant properties. The maximum is dictated by economic and practical considerations. Antioxidant effectiveness is also noted when a mixture of 0.1 percent by weight of the claimed antioxidants and 0.1 percent by weight of a conventional copper inhibitor is incorporated into polyolefins.

It will be further understood that additional materials can also be used in compositions described, such as conventional pigments, reinforcing agents, fillers, accelerators, and the like, which are well known to workers skilled in the art.

In order to aid in the understanding of the invention an outline of the procedure employed in determining antioxidant effectiveness will now be given.

Initially, the antioxidants were prepared synthetically. The hydrocarbon polymer together with the antioxidant was prepared by mixing a heated, 2-roll, differential-speed mill. Various concentrations of the antioxidant ranging from 0.00 (control) to 5.0 percent by weight based on the weight of the polymer were incorporated into the polymer being tested. Test samples approximately 10 mils in thickness were obtained by compression molding at about 20°C above the melting range of the polymer. Wire samples were prepared from milled material using a twin screw extruder maintaining the barrel and crosshead temperatures at about 218°C.

Duplicate samples of the 10-mil molded material, each weighing 0.10 gram, were placed in calibrated oxygen uptake burets and sealed in an atmosphere of pure oxygen. The specimens were then placed in constant temperature baths and the time required for the interaction of the polymer composition with 1cc, ( or 10cc. per gm) was chosen as the point at which oxidation had proceeded sufficiently to destroy useful physical and dielectric properties of the polymeric composition. Duplicate samples were prepared for each composition at a variety of temperatures both above and below the melting range of the polymer itself. Some wire samples were aged in a circulating-air oven at 70°C for several months in order to facilitate studying the permanence of the stabilizers.

The activation energies for the conventional antioxidant and the three preferred antioxidants, both unaged and aged and the unaged, unstabilized high density polyethylene were calculated from points on a monographical representation of energy in kcal/mole against failure time $t_{10}$ in hours on the left ordinate and temperature in degrees centigrade on the right ordinate as seen in Table I. The failure times and corresponding temperatures were already experimentally determined and then joined on the monograph to generate a family of lines which had a common point of intersection, that of the activation energy.

With reference now more particularly to the drawing, FIG. 1 is a graphical representation of induction period against the reciprocal of absolute temperature showing the time period required to effect thermal oxidation of high density polyethylene described above for one concentration of the unaged antioxidants. It will be noted that at an extrapolated service temperature of 70°C and at 0.2 percent by weight antioxidant, the proposed antioxidants are competitive with the conventional antioxidant and from this it has been concluded that the antioxidants will perform with even greater efficacy at temperatures of 70°C and lower.

FIG. 2 is a graphical representation of the same compounds at the same concentration in high density polyethylene but after they had been oven aged approximately 60 days at 70°C. It will be noted that at the extrapolated service temperature of 70°C, the aged antioxidants are still competitive with the conventional antioxidant and will perform with an even greater degree of efficacy at temperatures of 70°C and lower.

Table I is a representation in tabular form showing the activation energies in kcal/mole for thermal oxidation of the antioxidants described based on $t_{10}$ induction period for temperatures less than 120°C. Typical service temperatures range from ambient to about 70°C which is much less than the upper limit of 120°C. The activation energy for the unstabilized wire is found to be 30 kcal/mole. The conventional antioxidant at 0.2 percent by weight was 35 kcal after aging for two months at 70°C. All three aged antioxidants show activation energies greater than that of the conventional antioxidant and the unstabilized wire. This data leads to the conclusion that the antioxidants will perform as expected on the extrapolated lines in FIGS. 1 and 2.

TABLE I

ACTIVATION ENERGIES FOR THERMAL OXIDATION
(based on $t_{10}$ induction period)

POLYETHYLENE

| | Unaged | Aged 2 months at 70°C |
|---|---|---|
| 1 Unstabilized HDPE ins.wire | 30 kcal/mole | 30 kcal/mole |
| 2 Wire ins.with 0.2% 1010 | 30 kcal/mole | 35 kcal/mole |
| 3 Wire ins.with 0.2% V | 70 kcal/mole below 120°C | 65 kcal/mole below 120°C |
| 4 Wire ins.with 0.2% VI | 50 kcal/mole below 120°C | 48 kcal/mole below 120°C |
| 5 Wire ins.with 0.2% VII | 52 kcal/mole below 120°C | >41 kcal/mole below 120°C |

What is claimed is:

1. Composition of matter comprising polyolefins stabilized against oxidative degradation with an antioxidant having the general formula:

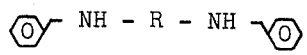

wherein —R— is selected from the group consisting of

A) 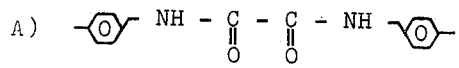

B) 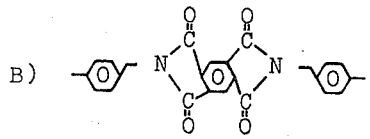

C) 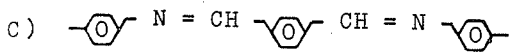

2. Composition in accordance with claim 1 wherein the said polyolefin comprises polyethylene.

3. Composition in accordance with claim 1 wherein the said polyolefin comprises polypropylene.

4. Composition in accordance with claim 1 wherein the concentration of the said antioxidant ranges from 0.2–5.0 percent by weight based on weight of polymer.

5. Composition in accordance with claim 2 wherein R is:

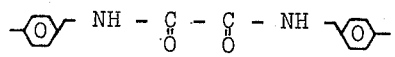

6. Composition in accordance with claim 2 wherein R is:

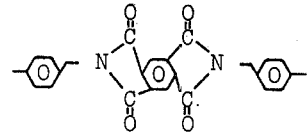

7. Composition in accordance with claim 2 wherein R is:

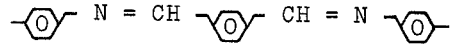

* * * * *